United States Patent [19]
Merritt

[11] 3,828,520
[45] Aug. 13, 1974

[54] VACUUM PACKAGING METHOD AND PLATEN THEREFOR

[75] Inventor: Charles Merritt, Corpus Christi, Tex.

[73] Assignee: Substrate Inc., Corpus Christi, Tex.

[22] Filed: Apr. 4, 1973

[21] Appl. No.: 347,637

[52] U.S. Cl................. 53/22 A, 53/112 A, 425/388
[51] Int. Cl........................................... B65b 31/00
[58] Field of Search ......... 53/22 A, 112 A; 425/388

[56] References Cited
UNITED STATES PATENTS
3,411,974 11/1968 Jones-Hinton et al............. 425/388
3,694,991 10/1972 Perdue et al........................ 53/22 A Primary Examiner—Travis S. McGehee
Attorney, Agent, or Firm—Jack Schuman

[57] ABSTRACT

The top surface of a platen is provided with a plurality of apertures, leading to a vacuum chamber therein, and a plurality of protuberances extending upwardly therefrom, the apertures and protuberances being arranged as grids extending over the top of the platen. A first plastic film is placed on the platen top, leaving apertures and protuberances beyond the periphery of the first plastic film uncovered, the said film draping around those protuberances covered thereby, and being dimpled upwardly thereby. The article to be packaged is placed on the first film and a second plastic film is placed over the article and over the first film, covering the entire platen top, draping around those protuberances not covered by the first film so that the underside of the second film lies directly over those apertures not covered by the first film. The second film lies substantially flat across the tops of the dimples in the first film because of atmospheric air therebetween. Vacuum is applied to the platen, and air around article and between films is withdrawn through the channels defined by the dimples and thence through the apertures covered by the second film, whereupon atmospheric pressure acting on the top of the second film forces the second film into full contact with the first film around the article to make a completely sealed air tight package for the said article.

5 Claims, 5 Drawing Figures

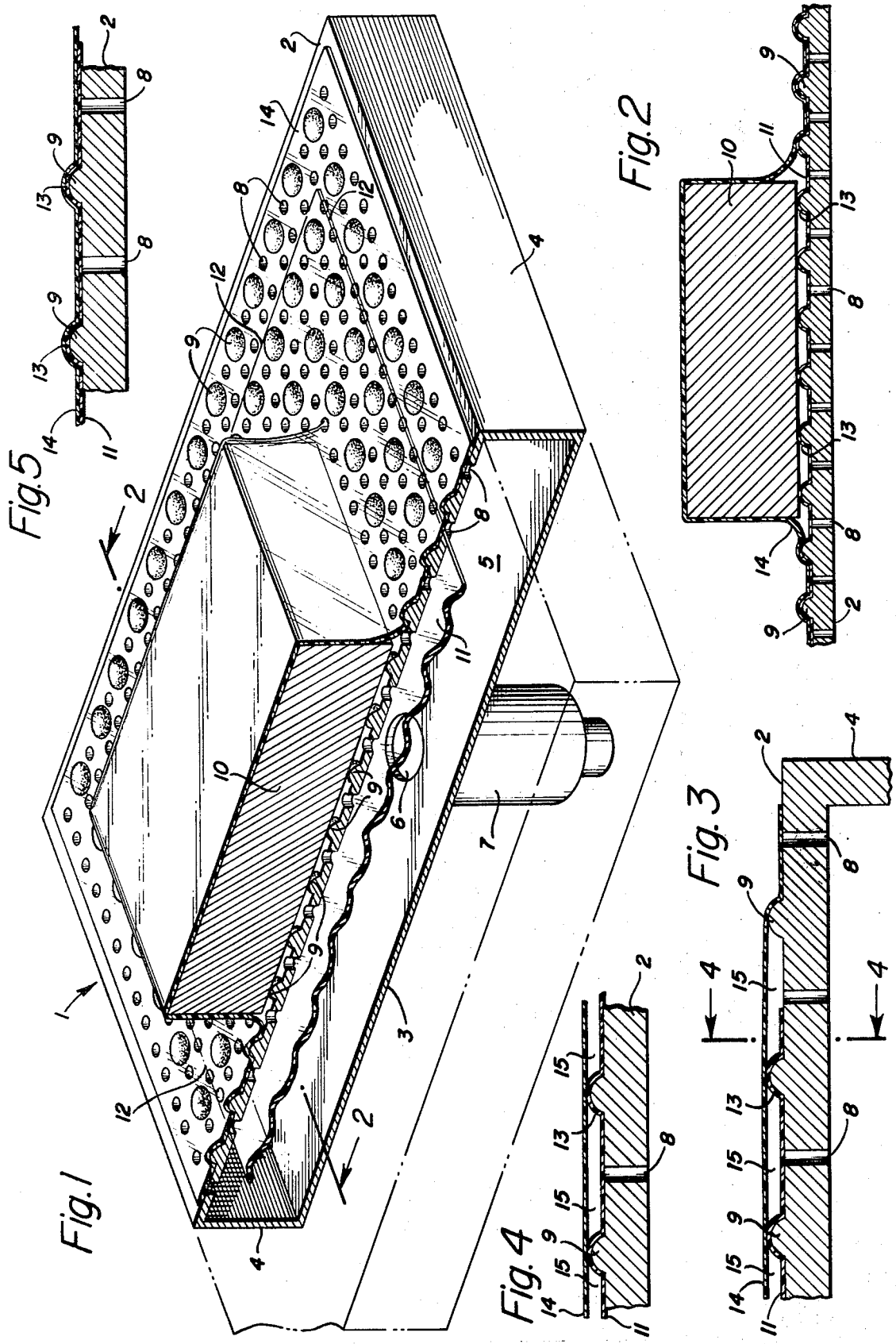

VACUUM PACKAGING METHOD AND PLATEN THEREFOR

BACKGROUND OF THE INVENTION

1. Field of the Invention:

This invention relates, broadly speaking, to a vacuum packaging method and to a platen therefor. More specifically, this invention relates to a method for making an airtight package comprising two plastic films which surround the packaged article, and to a platen particularly adapted for use in practising the method.

2. Description of the Prior Art:

U.S. Pat. No. 2,778,173 (1957) to Taunton discloses a method of producing an airtight sealed package wherein two films of packaging material sandwich the article therebetween. One or both films are first placed in heated forming dies to form projections thereon. Thereafter, the films are brought together with the material to be packaged therebetween, the projections on one film facing the other film, and a vacuum is drawn through an exhausting hole extending through one film and surrounded by the projections, thereby to remove air from between the films and from around the packaged article. Thereafter, the films may be heat sealed around the perimeter of the exhausting hole. No platen is described in this patent.

U.S. Pat. Nos. 3,255,567 (1966) and 3,311,517 (1967), both to Keslar et al., show a packaging bag with two two-ply layers of plastic material sandwiching the article to be packaged. Each inner ply of each of the two layers is embossed with a grid of circular, square or diamond-shaped protuberances, the grooves therebetween providing passageways for the escape of air from within the bag. The outer ply of each of the two layers is flat and unembossed. With three sides of the bag sealed, and the fourth side open, the article is placed therein, and the bag and article placed in an evacuation apparatus which draws air out through the open end of the bag, and thereafter the open end of the bag is heat sealed.

U.S. Pat. No. 3,216,172 (1965) to Piazze shows method and apparatus for sealing a vacuum pack bag. The bag comprises two sheets of plastic material, heat sealed along three sides, the lower sheet having an air evacuating opening formed therethrough. A stiff patch is interposed between the two sheets and sits over the evacuating opening. The patch has a number of projections formed on the lower surface thereof, which projections face the lower sheet, and further is provided with a plurality of apertures extending therethrough. After the material to be packaged has been placed in the bag through an open side thereof and over the patch, and the open side is heat sealed, the bag is laid on a flat table having a vacuum pipe which is set under the evacuating opening in the lower sheet whereby to withdraw air from the bag. Thereafter, the lower sheet and the patch are heat sealed around the perimeter of the evacuating opening.

U.S. Pat. No. 3,490,193 (1970) to Eells et al., discloses a vacuum platen for transparent film packaging. The platen has a flat upper surface with a grid of apertures formed therethrough. The method described in this patent is not for encasing an article between two non-porous plastic films, but rather for packaging an article between a porous substrate and a single plastic film.

Other prior art generally relating to this field is found in U.S. Pat. No. 2,155,445 (1939) to Pittenger et al., U.S. Pat. No. 2,949,713 (1960) to Vogt, U.S. Pat. No. 3,103,774 (1963) to Wall, and U.S. Pat. No. 3,216,832 (1965) to King.

SUMMARY OF THE INVENTION

One of the objects of this invention is to provide an improved method for vacuum packaging and to an improved platen adapted for use in practising the method.

Another of the objects of this invention is to provide an improved method for making an airtight package comprising two nonporous plastic films which surround the packaged article, and to an improved platen particularly adapted for the method.

A specific object of this invention is to provide an improved vacuum platen having a particular profile on the top surface thereof which facilitates the withdrawal of air from between two plastic films positioned on the said top surface.

Still another object of this invention is to provide an improved vacuum packaging platen which is economical to construct, durable in operation and effective in results.

Yet other and further objects of this invention will become apparent during the course of the following description and by reference to the accompanying drawing and the appended claims.

Briefly, it has been discovered that the foregoing objects may be attained by providing a platen having a chamber formed therein and communicable with a source of vacuum. The top surface of the platen has a plurality of apertures formed therethrough and communicating with the chamber, and further has a plurality of protuberances extending upwardly therefrom, the apertures and protuberances being arranged as grids extending over the top of the platen. To package an article, a first plastic film is placed on the platen top, leaving apertures and protuberances beyond the edge of the first plastic film uncovered thereby, the film draping around those protuberances covered thereby and being upwardly dimpled thereby. The article is placed on the central portion of the first film, and then a second plastic film is placed over the article and the first film, covering the entire platen top, draping around those protuberances not covered by the first film so that the underside of the second film lies directly over those apertures not covered by the first film. The second film lies substantially flat across the tops of the dimples in the first film because of atmospheric air between the two films. Vacuum is applied to the chamber in the platen, and air around the article and between the films is withdrawn through the channels generally defined by the dimples and thence through the apertures covered by the second film, whereupon atmospheric air pressure acting on the upper surface of the second film forces the second film into full contact with the first film around the article to make a completely sealed airtight package.

BRIEF DESCRIPTION OF THE DRAWING

Referring now to the drawing in which like numerals represent like parts in the several views:

FIG. 1 represents a view in perspective of the platen, the two plastic films and the article to be packaged therebetween, the said platen, article and films being medially sectioned.

FIG. 2 represents a section of a portion of the platen top and the article between the two plastic films, taken along the line 2—2 of FIG. 1.

FIG. 3 represents an enlarged detail of a portion of the platen top including the edge of the platen, showing the first film lying on the platen top and upwardly dimpled by the platen top protuberances, and the second film lying generally across the tops of the dimples in the first film with the channels therebetween defined by the dimples in the first film prior to the application of vacuum to the channels.

FIG. 4 represents an enlarged detail of a portion of the platen top taken as a section along the line 4—4 of FIG. 3.

FIG. 5 represents an enlarged detail of a portion of the platen top and the two plastic films in full contact with each other after the application of vacuum to the channels therebetween.

DESCRIPTION OF THE PREFERRED EMBODIMENT

Platen 1 is seen as comprising top plate 2, bottom plate 3, and side walls 4, all secured together by any suitable means such as welding or the like, and defining therebetween a chamber 5. An aperture 6 is provided in bottom plate 3, and communicates between chamber 5 and a vacuum source 7.

A plurality of apertures 8 are provided through top plate 2, communicating with chamber 5 and arranged in the form of a grid extending across top plate 2.

A plurality of tumuli or protuberances 9 are provided on top plate 2, preferably formed integrally therewith, extending upwardly therefrom and arranged in the form of a grid extending across top plate 2.

It will be noted that generally the protuberances are surrounded on at least three sides by apertures 8.

Advantageously, apertures 8 may be approximately 3/32 inch in diameter, spaced on about 3/16 inch centers, and protuberances 9 may be generally convex mounds of approximately ¼ inch base diameter and ⅛ inch in height, spaced on ⅜ inch centers.

The films employed in the practice of the present invention are preferably of flat, non-porous thermoplastic material.

The operation of packaging article 10 and the employment of platen 1 therefor will now be described.

A first film 11 of material of the type hereinabove mentioned is softened by heating and placed on the top plate 2 of platen 1 so that at least one of the edges 12 thereof (and preferably all of the edges 12 thereof) does not extend to the edge of top plate 2, thereby leaving uncovered by the said first film 11 some of the apertures 8 and protuberances 9 as shown in FIG. 1. First film 11 drapes over and conforms substantially with the shape of those protuberances 9 covered thereby, so that the said protuberances 9 produce dimples 13 in first film 11 extending upwardly therefrom.

Article 10 is placed on first film 11, generally in the central portion thereof as shown.

A second film 14 of material of the type hereinabove mentioned is softened by heating and pulled over article 10 and onto first film 11 and platen 1 where the latter extends beyond the edge 12 of the said first film 11, said second film 14 covering the entire top plate 2 of platen 1. Second film 14 drapes over and conforms substantially with the shape of those protuberances 9 not covered by first film 11, so that the underside of second film 14 lies directly over those apertures 8 in top plate 2 not covered by first film 11. Second film 14 lies substantially flat across the tops of dimples 13 in first film 11 because of atmospheric air pressure between the two films 11 and 14.

A vacuum, advantageously 3–4 inches Hg, is applied to chamber 5, and air between the article 10 and first and second films 11 and 14 is withdrawn through the channels 15 between the said two films 11 and 14 defined by the said dimples 13 and out through those apertures 8 beyond the edge 12 of first film 11 and covered by second film 14, whereupon atmospheric pressure acting on the upper surface of second film 14 forces the said second film 14 into full contact with article 10 and with the first film 11 around the said article 10, thereby to make a completely sealed airtight package. Thereafter, the vacuum in chamber 5 is released, and the package may now be removed from the top of platen 1.

Protuberances 9 may have shapes other than the generally convex mounds herein described.

What is claimed is:

1. Vacuum packaging method comprising:
  a. placing the bottom surface of a first film on a grid of upwardly extending protuberances, thereby to provide the top surface of said first film with a plurality of upwardly extending dimples arranged as a grid extending across said top surface,
  b. placing an article to be packaged on the top surface of said first film,
  c. placing a second film over said article and said first film, the bottom surface of said second film being supported on said dimples and thereby vertically spaced from the top surface of said first film, said dimples defining channels between the top surface of said first film and the bottom surface of said second film which channels extend to the edge of said first film,
  d. applying a vacuum to the edge of said first film thereby to exhaust air from around said article and from between said first film and said second film, whereupon atmospheric pressure acting on the top surface of said second film forces the bottom surface of said second film into full contact with the top surface of said first film around the perimeter of said article thereby to provide an airtight package around said article.

2. Method as in claim 1, wherein:
  e. said article is supported on said dimples.

3. Method as in claim 1, wherein
  e. said second film when placed over said first film extends beyond the edge thereof.

4. Method as in claim 3, wherein:
  f. said grid of protuberances is provided on a platen,
  g. the outer area of that portion of said second film extending beyond the edge of said first film being in full contact with said platen,
  h. step (d) is performed by applying the vacuum to the underside of that portion of said second film which extends beyond the edge of said first film.

5. Method as in claim 4, wherein:

i. said first and second films are formed from thermoplastic non-porous material,
j. said first film is softened by heating to promote dimpling thereof by said protuberances,
k. said second film is softened by heating to promote the edge thereof making full contact with said platen and to promote the forcing of said second film by atmospheric pressure into full contact with said article and with said first film around said article upon application of said vacuum.

* * * * *